United States Patent
Ielmini et al.

(10) Patent No.: US 10,860,292 B2
(45) Date of Patent: Dec. 8, 2020

(54) DEVICE AND METHOD FOR GENERATING RANDOM NUMBERS

(71) Applicant: Politecnico Di Milano, Milan (IT)

(72) Inventors: Daniele Ielmini, Bergamo (IT); Simone Balatti, Samolaco (IT); Stefano Ambrogio, Varese (IT)

(73) Assignee: POLITECNICO DI MILANO, Milan (IT)

( * ) Notice: Subject to any disclaimer, the term of this patent is extended or adjusted under 35 U.S.C. 154(b) by 148 days.

(21) Appl. No.: 16/077,514

(22) PCT Filed: Mar. 3, 2017

(86) PCT No.: PCT/IB2017/051250
§ 371 (c)(1),
(2) Date: Aug. 13, 2018

(87) PCT Pub. No.: WO2017/153875
PCT Pub. Date: Sep. 14, 2017

(65) Prior Publication Data
US 2019/0042201 A1  Feb. 7, 2019

(30) Foreign Application Priority Data
Mar. 8, 2016  (IT) ............... UA2016A001468

(51) Int. Cl.
*G06F 7/58* (2006.01)
*H04L 9/08* (2006.01)
(Continued)

(52) U.S. Cl.
CPC ............ *G06F 7/588* (2013.01); *G09C 1/00* (2013.01); *G09C 1/10* (2013.01); *G11C 13/004* (2013.01);
(Continued)

(58) Field of Classification Search
None
See application file for complete search history.

(56) References Cited

U.S. PATENT DOCUMENTS 7,961,494 B2 * 6/2011 Scheuerlein ........ G11C 11/5678
365/100
8,680,906 B1   3/2014 McDonald et al.
(Continued)

FOREIGN PATENT DOCUMENTS

EP   2933720 A1  10/2015
KR   101566949   11/2015
(Continued)

OTHER PUBLICATIONS

Brederlow et al., "A Low-Power True Random Number Generator Using Random Telegraph Noise of Single Oxide-Traps", Dated Feb. 8, 2006, IEEE International Solid-State Circuits Conference (10 Pages).
(Continued)

*Primary Examiner* — Michael D. Yaary
(74) *Attorney, Agent, or Firm* — Mark Malek; Widerman Malek, PL

(57) ABSTRACT

The invention relates to a device for generating random numbers, comprising a pair of memristors. The pair of memristors comprises a first and a second memristor, each memristor of the pair in turn comprises a top electrode, a bottom electrode and an intermediate layer adapted to switch resistance in response to predetermined voltage values applied between the top electrode and the bottom electrode. Each memristor is operatively connected to an output terminal by means of its bottom electrode. A control logic is connected to the memristors for applying suitable voltages necessary to determine a change of resistance in at least one memristor of the pair.

9 Claims, 7 Drawing Sheets

(51) Int. Cl.
- *G09C 1/00* (2006.01)
- *G09C 1/10* (2006.01)
- *G11C 13/00* (2006.01)

(52) U.S. Cl.
CPC ...... *G11C 13/0038* (2013.01); *G11C 13/0059* (2013.01); *G11C 13/0069* (2013.01); *H04L 9/0866* (2013.01); *G11C 13/0007* (2013.01); *G11C 2013/0092* (2013.01); *H04L 2209/12* (2013.01)

(56) References Cited

U.S. PATENT DOCUMENTS

| | | | | |
|---|---|---|---|---|
| 9,910,639 | B2* | 3/2018 | Le Gallo | H01L 27/01 |
| 2013/0235647 | A1* | 9/2013 | Kim | G11C 13/0004 365/148 |
| 2013/0322154 | A1* | 12/2013 | Youn | G11C 13/0007 365/148 |
| 2014/0268994 | A1 | 9/2014 | Rose et al. | |
| 2015/0105687 | A1 | 4/2015 | Abreu | |
| 2015/0149517 | A1* | 5/2015 | Matthews | H03K 19/20 708/190 |
| 2015/0200363 | A1* | 7/2015 | Sacchetto | G11C 11/56 365/148 |
| 2017/0249990 | A1* | 8/2017 | Bauer | G11C 13/06 |

FOREIGN PATENT DOCUMENTS

| | | |
|---|---|---|
| WO | WO 2015/105687 A1 | 7/2015 |
| WO | WO 2017/153875 A1 | 9/2017 |

OTHER PUBLICATIONS

Huang et al., "A Contact-Resistive Random-Access-Memory-Based True Random Number Generator", Aug. 2012, IEEE Electron Device Letters, vol. 33, No. 8 (pp. 1108-1110).

Mathew et al., "2.4 Gbps, 7 mW All-Digital PVT-Variation Tolerant True Random Number Generator for 45 nm CMOS High Performance Microprocessors", Nov. 2012, IEEE Journal of Solid-State Circuits, vol. 47, No. 11 (pp. 2807-2821).

Gaba et al., "Stochastic Memristive Devices for Computing and Neuromorphic Applications", 2013, RSC Publishing, Nanoscale, No. 5 (pp. 5872-5878).

Balatti et al., "Multiple Memory States in Resistive Switching Devices Through Controlled Size and Orientation of the Conductive Filament", Dated Mar. 13, 2013, Advanced Materials, vol. 25, No. 10 (pp. 1474-1478).

Choi et al., "A Magnetic Tunnel Junction Based True Random Number Generator with Conditional Perturb and Real-Time Output Probability Tracking", Dated 2014, IEEE International Electron Devices Meeting (pp. 315-318).

Fukushima et al., "Spin Dice: A Scalable Truly Random Number Generator Based on Spintronics", Dated 2014, Applied Physics Express, No. 7 (4 Pages).

Ambrogio et al., "Statistical Fluctuations in Hfox Resistive-Switching Memory: Part II—Random Telegraph Noise", Dated Aug. 2014, IEEE Transactions on Electron Devices, vol. 61, No. 8 (pp. 2920- 2927).

Yu, "Orientation Classification by a Winner-Take-All Network with Oxide RRAM Based Synaptic Devices", Dated Year 2014, School of Computing, Informatics, and Decision Systems Engineering, Circuits and Systems (ISCAS), 2014 IEEE International Symposium on. (pp. 1058- 1061).

Zhang et al., "Feasibility Study of Emerging Non-Volatile Memory Based Physical Unclonable Functions", Dated Year 2014, School of Electrical and Electronic Engineering, Nanyang Technological Univ., Proc. International Memory Workshop (IMW) (pp. 1-4).

Chen, "Comprehensive Assessment of RRAM-Based PUF for Hardware Security Applications", Dated 2015, IEDM Tech. Dig. (pp. 285-268).

Chen, "Utilizing the Variability of Resistive Random Access Memory to Implement Reconfigurable Physical Undonable Functions", Feb. 2015, IEEE Electron Device Letters, vol. 36, No. 2 (p. 138-140).

Balatti et al., "True Random Number Generation by Variability of Resistive Switching in Oxide-Based Devices", Date Jun. 2015, IEEE Journal of Emerging and Selected Topics in Circuits and Systems, vol. 5, No. 2 (pp. 214- 221).

Ambrogio et al., "Noise-Induced Resistance Broadening in Resistive Switching Memory—Part II: Array Statistics", Dated Nov. 2015, IEEE Transactions on Electron Devices, vol. 62, No. 11 (pp. 3812-3819).

Wang et al., "A Novel True Random Number Generator Design Leveraging Emerging Memristor Technology", Dated Year 2015, Dept. of Electrical & Computer Engineering, Univ. of Pittsburgh, PA., Great Lakes Symposium on VLSI (pp. 271-276).

Balatti et al., "Normally-off Logic Based of Resistive Switched— Part II: Logic Circuits", Dated Jun. 6, 2015, IEEE Transactions on Electron Devices, vol. 62, No. 6 (pp. 1839-1847).

Edwards et al., "Reconfigurable Memristive Device Technologies", Dated Jul. 7, 2015, Proceedings of the IEEE, vol. 103, No. 7 (pp. 1004-1033).

IT PTO, "International Search Report for related Italian patent application serial No. UA20161468 filed Mar. 8, 2016", Dated Oct. 26, 2016.

IT PTO, "Written Opinion for related Italian patent application serial No. UA20161468 filed Mar. 8, 2016", Dated Oct. 26, 2016.

EPO, "International Search Report for related international application serial No. PCT/IB2017/051250 filed Mar. 3, 2017", Dated Jun. 20, 2017.

EPO, "Written Opinion for related international application serial No. PCT/IB2017/051250 filed Mar. 3, 2017", Dated Jun. 20, 2017.

* cited by examiner

DEVICE AND METHOD FOR GENERATING RANDOM NUMBERS

RELATED APPLICATIONS

This application is related to international patent application PCT/IB2017/051250 filed on Mar. 3, 2017 and titled Random Number Generation from Multiple Memory States, and claims priority to Italian patent application no. UA2016A001468 filed Mar. 8, 2016, the entire content(s) of which is/are incorporated herein by reference.

FIELD OF THE INVENTION

The present invention relates to electronic methods and devices for generating random numbers.

The invention finds a preferred application in systems-on-chip requiring generation of random numbers for cryptography applications or containing a hardware signature for the purpose of security of transmitted information.

Generally the invention relates to a device according to the preamble of claim 1 and to a relevant method for generating random numbers.

PRIOR ART

Random number generation is essential for generating random cryptography keys for secure transmission protocols [1]. Pervasiveness of Internet-based communication and the need of protecting data from eavesdropping lead to the need for compact random number generation circuits (RNG), able to generate true random numbers with high entropy quality and high throughput. In order to generate true random numbers, that do not rely on deterministic algorithms and are totally unpredictable, it is important to identify a convenient on-chip entropy source and to design the corresponding circuit for generating the random bit stream with high throughput and stability. Previous approaches for generating true random numbers provide as the source the random telegraph noise (RTN) in dielectrics [2] or in resistive-switching memories (RRAM) [3]. The RTN appears as a random fluctuation of current, or resistance, between two or more levels, resulting from the random charging/discharging of bistable defects [4]. However, RTN is difficult to control in terms of amplitude and frequency, thus increasing the need for dedicated techniques for exploiting RTN. Moreover RTN has been shown to be unstable in RRAMs, where the current fluctuation at a given bias can show unpredictable onset and interruption [5]. Other schemes, based on physical fluctuation phenomena, therefore are under investigation to obtain efficient and stable random number generation.

Recently novel RNG concepts based on the switching variability in low-voltage memory technologies, such as spin transfer torque (STT) magnetic memories MRAM ([6], [7]) and RRAM ([8], [9]) have been proposed.

The switching statistical variability in RRAM was similarly applied to develop physical unclonable functions (PUF) [10] and to improve learning in neuromorphic circuits [11].

For generating random numbers it is possible to exploit the stochastic variation of a switching parameter, such as the voltage $V_{set}$ necessary for setting the transition from high to low resistance [12]. Application of a voltage close to the median value of the distribution of $V_{set}$ statistically results in a transition only in a random fraction of attempts. An important problem in this approach, however, is the need for a careful tracking of the applied voltage, which must be exactly centered in the median value of the $V_{set}$ distribution to guarantee a perfect balance between 0 and 1 [12]. For this aim, real-time voltage tracking techniques must be used for compensating 0 and 1 probabilities [7].

Random number generating circuits using memristors are described in U.S. Pat. No. 8,680,906 B1, EP 2 933 720 A1, KR101566949 and US20140268994.

Patent applications EP2933720, KR101566949 and US20140268994 use a memristor by employing stochastic writing to obtain random functions. However such solutions use only one memristor, which makes the uniform generation of random bits more complicated and subjected to an accurate calibration of the generating algorithm.

The U.S. Pat. No. 8,680,906, to United States Air Force, uses two memristors in series arrangement. Memristors initially are prepared in a low resistance state (LRS), then a voltage is applied to the ends of the series connection such to cause the random reset of one of the two memristors. Such operation causes the random reset only in one memristor, where all the applied voltage is substantially concentrated, this leading to a rapid degeneration of memristors.

Other solutions using two memristors are described in [13] and [14].

[13] and [14] disclose circuits for implementing a PUF, where two RRAM cells (in HRS) are connected to two respective inputs of a comparator that generates a output bit depending on the resistance difference of the two cells. [13] also discloses that, to stabilize the output of the comparator, the cell having the lower resistance can be set in LRS, thus increasing the difference between resistances. The drawback of such solution is the need for a suitable circuit for programming the state of the memristors, downstream the reading and the comparison of resistances in the 2 memristors.

REFERENCES

[1] S. K. Mathew, S. Srinivasan, M. A. Anders, H. Kaul, S. K. Hsu, F. Sheikh, A. Agarwal, S. Satpathy, and R. K. Krishnamurthy, "2.4 Gbps, 7 mW all-digital PVT-variation tolerant true random number generator for 45 nm CMOS high-performance microprocessors," IEEE J. SolidState Circ., vol. 47, no. 11, pp. 2807-2821, 2012.

[2] R. Brederlow, R. Prakash, C. Paulus, and R. Thewes, "A low-power true random number generator using random telegraph noise of single oxide-traps," ISSCC Tech. Dig., no. 1666, 2006.

[3] C.-Y. Huang, W. C. Shen, Y.-H. Tseng, Y.-C. King, and C.-J. Lin, "A contact-resistive random-access-memory-based true random number generator," IEEE Electron Device Lett., vol. 8, no. 33, pp. 1108-1110, August 2012.

[4] S. Ambrogio, S. Balatti, A. Cubeta, A. Calderoni, N. Ramaswamy, and D. Ielmini, "Statistical fluctuations in HfOx resistive-switching memory (RRAM): Part II—Random telegraph noise," IEEE Trans. Electron Devices, vol. 61, no. 8, pp. 2920-2927, August 2014.

[5] S. Ambrogio, S. Balatti, V. McCaffrey, D. Wang, and D. Ielmini, "Noiseinduced resistance broadening in resistive switching memory (RRAM)—Part II: Array statistics," IEEE Trans. Electron Devices, vol. 62, no. 11, pp. 3812-3819, November 2015.

[6] A. Fukushima, T. Seki, K. Yakushiji, H. Kubota, H. Imamura, S. Yuasa, and K. Ando, "Spin dice: A scalable truly random number generator based on spintronics," Appl. Phys. Express., no. 7, p. 083001, 2014.

[7] W. Choi, L. Yang, K. Jongyeon, A. Deshpande, K. Gyuseong, J.-P. Wang, and C. Kim, "A magnetic tunnel junction based true random number generator with conditional perturb and real-time output probability tracking," Electron Devices Meeting (IEDM), 2014 IEEE International, pp. 315-318, 2014.

[8] S. Gaba, P. Sheridan, J. Zhou, S. Choi, and W. Lu, "Stochastic memristive devices for computing and neuromorphic applications," in Nanoscale, no. 5, 2013, pp. 5872-5878.

[9] Y. Wang, W. Wen, M. Hu, and H. Li, "A novel true random number generator design leveraging emerging memristor technology," Great Lakes Symposium on VLSI, pp. 271-276, 2015.

[10] A. Chen, "Utilizing the variability of resistive random access memory to implement reconfigurable physical unclonable functions," Electron Device Letters, IEEE, vol. 36, no. 2, pp. 138-140, February 2015.

[11] S. Yu, "Orientation classification by a winner-take-all network with oxide RRAM based synaptic devices," Circuits and Systems (ISCAS), 2014 IEEE International Symposium on, pp. 1058-1061, 2014.

[12] S. Balatti, S. Ambrogio, Z.-Q. Wang, and D. Ielmini, "True random number generation by variability of resistive switching in oxide-based devices," in IEEE Journal on Emerging and Selected Topics in Circuits and Systems, vol. 5, no. 2, pp. 214-221 June 2015.

[13] An Chen, "Comprehensive Assessment of RRAM-based PUF for Hardware Security Applications" IEDM Tech. Dig. 265-268 (2015).

[14] Le Zhang, Xuanyao Fongy, Chip-Hong Chang, Zhi Hui Kong, Kaushik Roy "Feasibility Study of Emerging Non-Volatile Memory Based Physical Unclonable Functions" Proc. International Memory Workshop (IMW) 1-4, (2014).

SUMMARY OF THE INVENTION

It is the object of the present invention to overcome prior art drawbacks.

Particularly it is the object of the present invention to provide a method and a circuit for generating random numbers based on memristors that does not need probability tracking techniques.

These and further objects of the present invention are achieved by a device and a method embodying the characteristics of the annexed claims, which are an integral part of the present description.

Generally the device for generating random numbers comprises a pair of memristors. The pair of memristors comprises a first and a second memristor, each memristor of the pair in turn comprising a top electrode, a bottom electrode and an intermediate layer adapted to switch resistance in response to predetermined voltage values applied between the top electrode and the bottom electrode. Each memristor is operatively connected to an output terminal by its bottom electrode. A control logic is connected to memristors for applying suitable voltages necessary for determining a change of resistance in at least one of the memristors of the pair.

In detail the control logic is configured to:

fix the voltage of the output terminal to a predetermined value and apply said transition voltage to cause a change of resistance in at least one memristor of the pair, leave the voltage at said output terminal floating and apply to the top terminals of the first and second memristors two read voltages having opposite sign and amplitude lower than said transition voltage.

The particular connection of the two memristors, that actually are controlled in parallel, allows the resistance of the memristors to be changed without applying high voltages. By using the randomness of the resistance value of the memristor after the application of a SET or RESET voltage, it is possible to generate at the output terminal a voltage that can be positive or negative with a probability substantially of 50%, therefore it is possible to generate a random number (1 or 0) by associating it with the value of the voltage present at the output terminal.

The invention relates also to methods for generating random numbers that use the particular arrangement of the memristors mentioned above.

Further objects and advantages of the present invention will be more clear from the detailed description below.

BRIEF DESCRIPTION OF THE DRAWINGS

The invention will be described here below with reference to not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

Figure 1:
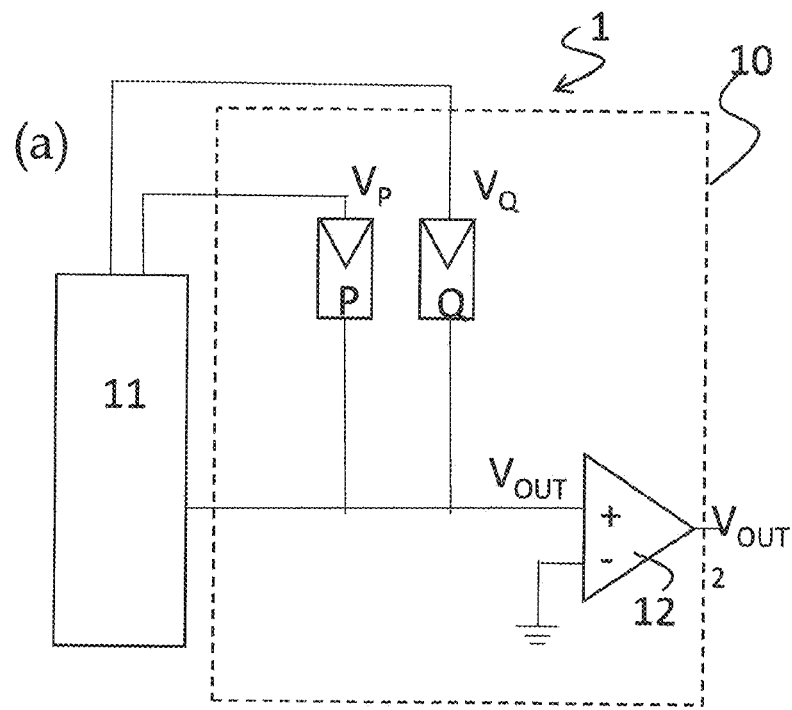
FIG. 1 is a device for generating random numbers (RNG) and the sequence of voltage pulses that have to be applied for RNG.
Figure 1:
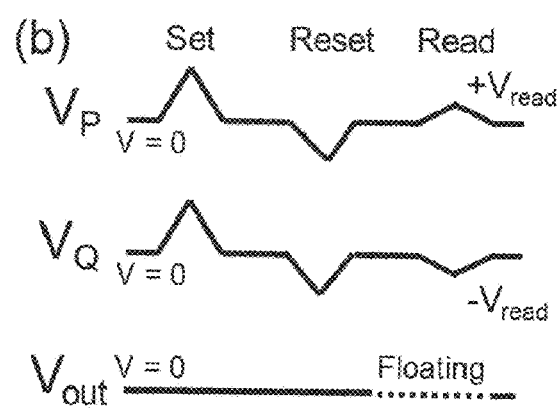

While the invention is susceptible of various modifications and alternative constructions, some disclosed embodiments are shown in the drawings and will be described in details herein below. It should be understood, however, that there is no intention to limit the invention to the specific disclosed embodiment but, on the contrary, the invention intends to cover all the modifications, alternative constructions and equivalents that fall within the scope of the invention as defined in the claims.

The use of "for example", "etc.", "or" denotes non-exclusive alternatives without limitation, unless otherwise noted. The use of "comprises" means "comprises, but not limited to", unless otherwise noted.

FIG. 1(a) shows a device 1 for generating random numbers, comprising a generating section 10 and a control logic 11 (for example a microprocessor or a FPGA) generating the necessary signals for controlling the generating section 10.

The generating section comprises two memristors (P and Q) connected in parallel to the input terminal of a comparator 12 whose other input terminal is grounded.

The word memristor means a variable resistance device whose resistance value can be changed by applying a suitable voltage at its ends.

Figure 2:
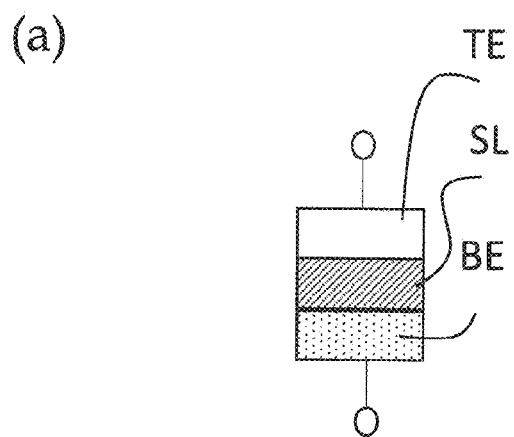
FIG. 2 is a memristor and its voltage-current characteristics.
Figure 2:
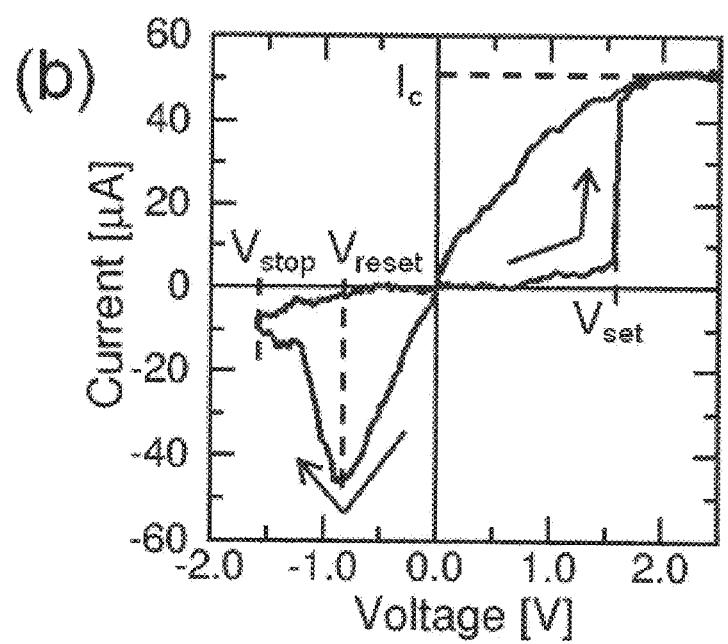

An example of a memristor is shown in FIG. 2(a), it comprises a switching layer (SL) of HfO$_2$ (or another oxide) with a TiN bottom electrode (BE) and a Ti top electrode (TE), that acts as oxygen exchange layer for generating defects at TE side.

Such as shown in FIG. 2b, the application of a positive voltage (that is from BE to TE) $V_{set}$ at the ends of the memristor, causes SET transition, where switching occurs from high resistance state (HRS) to low resistance state (LRS), while the application of a negative voltage $V_{reset}$ causes RESET transition from LRS to HRS. Each memristor P and Q therefore has a variable resistance that can be programmed by causing a SET or RESET transition.

In the example described here, the memristors have a SET voltage $V_{SET}$=1.5V and a RESET voltage $V_{RESET}$=−0.9V for a typical ramp rate of $10^3$ V/s. A compliance current (limitation) IC=50 μA was used during the SET transition by applying a relatively low gate voltage. A maximum negative voltage $V_{stop}$ of 1.5V is applied during the reset sweep.

With reference again to the device of FIG. 1(a), for random number generation, the control logic 11 applies voltage signals to the inputs of the generating section 10 according to a method providing three steps that are cyclically repeated and are shown herein below with reference to FIG. 1b and FIG. 3.

Firstly the method provides to apply (301) a positive voltage to the top electrode (TE) of P and Q to cause SET transition. In the example of FIG. 1 the control logic 11 keeps to ground the voltage $V_{out}$ measured at the positive input terminal of the comparator 12 and applies to the ends of the memristors P and Q a triangular voltage pulse ($V_P$, $V_Q$) of 1 ms in duration and amplitude higher than $V_{SET}$.

Then, step 302, a negative voltage $V_{RESET}$ is applied to top electrodes of P and Q to cause the RESET transition in both the variable resistances $R_P$ and $R_Q$. Also in this case, for the reset voltage a triangular pulse is applied of 1 ms in duration and an amplitude higher than (in absolute value) $V_{RESET}$.

Finally, step 303, the step reading the random bit is performed. In this step the control logic 11 is disconnected from the input terminal of the comparator to which memristors P and Q are connected and applies to the top electrode TE of the transistor P a voltage $V_P$=+$V_{Read}$ and, to the electrode TE of Q a voltage $V_Q$=−$V_{Read}$, where 2$V_{Read}$<$V_{Set}$. $V_{Read}$ can be for example equal to 0.3 V, therefore it is not enough for causing a change of resistance in the memristors. In the example of FIG. 1(b), also for the reading a triangular pulse is applied with 1 ms in duration and amplitude $V_{read}$.

Now the input node of the comparator 12 has a voltage that will be slightly positive or negative depending on whether the resistance of P is smaller or greater than the resistance of Q, respectively. Therefore it is possible to assign a logic value of 1 or 0 to the value of the measured voltage of $V_{OUT}$.

This method uses the characteristic of memristors that, statistically, are never with the same HRS resistance after SET and RESET process. As a result of the relatively high statistical variation of HRS resistance, $V_{out}$ randomly changes from one to another reading cycle, thus acting as an output bit value in the RNG method. In this arrangement, the variation in HRS resistance acts as entropy source for the RNG method.

The output of the analog comparator (12) is used to digitally regenerate $V_{out}$.

FIG. 4(a) shows a variant of the circuit of FIG. 1, that uses two cells 13 and 14 of a RRAM with 1T1R structure.

Each cell, shown in FIG. 4(b), comprises a memristor of the type described above with reference to FIG. 2(a), connected to the drain of a cell transistor 20, for example a MOSFET.

The source of the cell transistor 20 is connected to the positive input of the comparator 12, thus by applying a sufficiently high gate voltage $V_{G2}$ it is possible to short circuit the transistor and to connect the positive input of the comparator 12 to the bottom electrode BE of each memristor P, Q.

Figure 4:
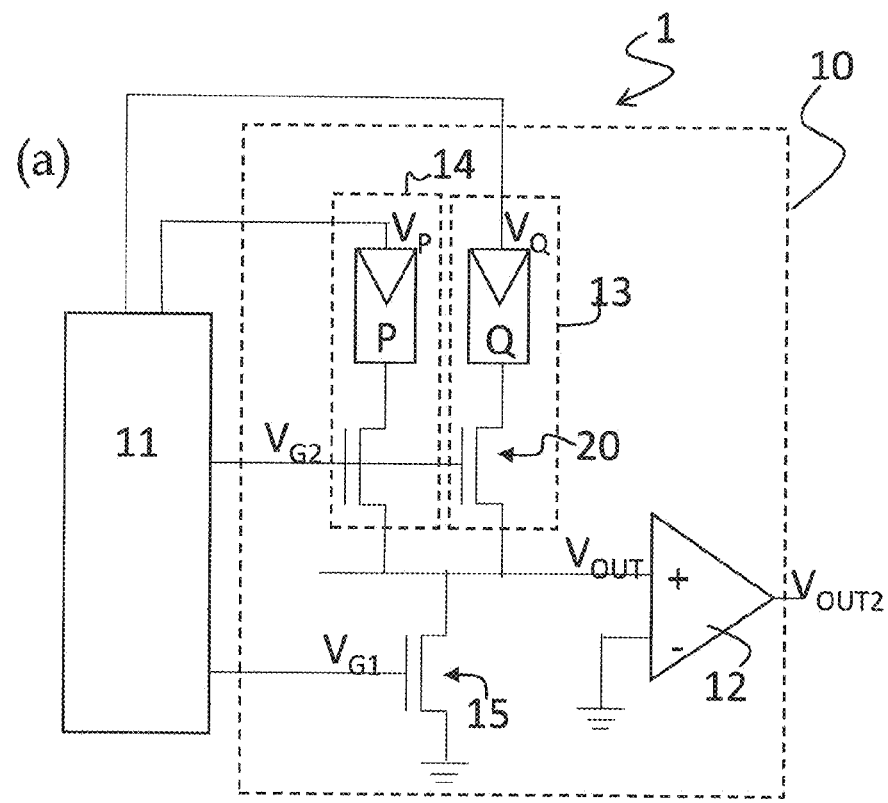
FIG. 4 is a variant of the device of FIG. 1 and the sequence of voltage pulses that have to be applied for RNG.
Figure 4:
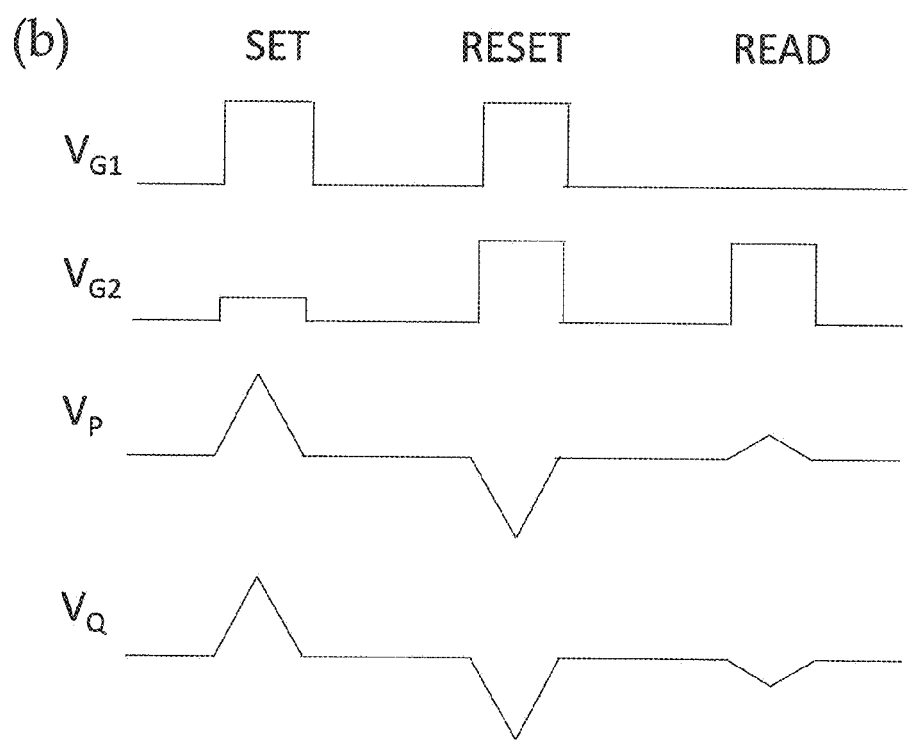
Figure 5:
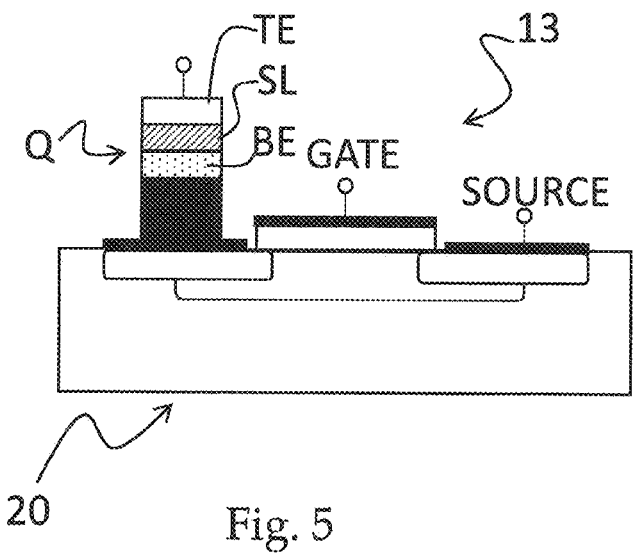
FIG. 5 schematically is a cell of a RRAM.

In the device of FIG. 4, the generating section 10 comprises a transistor 15, particularly a MOSFET, whose drain is connected to the positive electrode of the comparator 12 and whose source is grounded.

Figure 3:
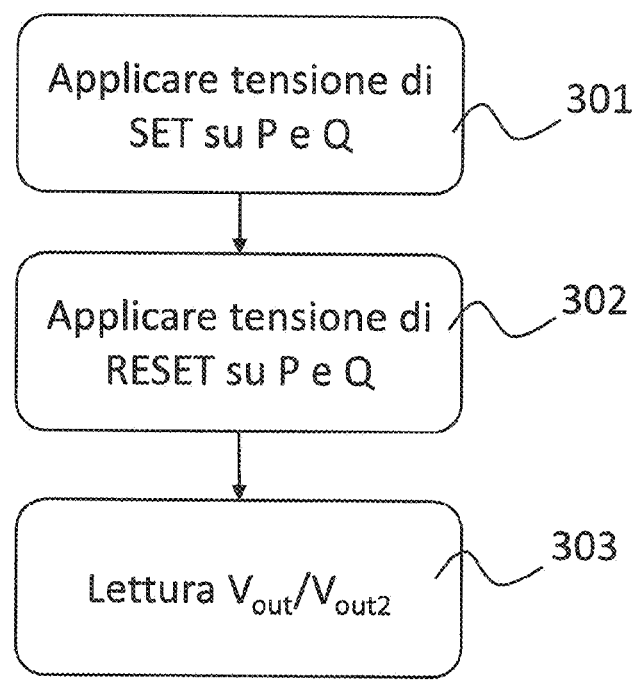
FIG. 3 is a flow chart of a RNG method.

In order to implement the method of FIG. 3, the control logic 11 controls voltages $V_P$, $V_Q$, $V_{G1}$ and $V_{G2}$ such as shown in FIG. 4(b).

During SET phase, $V_{G1}$ is kept high (for example equal to the power voltage of the circuit $V_{DD}$) in order to ground the voltage $V_{OUT}$. Cell transistors 20 are switched on by applying a voltage $V_{G2}$ just above threshold, while to the top electrodes TE of P and Q a positive voltage equal to or higher than voltage $V_{SET}$ is applied. In the example shown here $V_P$ and $V_Q$ are brought to the power voltage VDD, higher than threshold one. Both the memristors therefore perform a SET transition and switch to low resistance value (LRS). In the example described herein triangular voltage pulses of 1 ms in duration are applied to the electrodes TE of P and Q, however it is possible to use different waveforms (e.g. rectangular or parabolic) and of different duration.

Then during the reset phase the transistor 15 is short circuited, meaning that $V_{G1}$ is kept high (for example equal to the power voltage of the circuit $V_{DD}$) in order to ground the voltage $V_{OUT}$. A similar control is performed on $V_{G2}$ to be sure that the drain source voltage of the transistor is as near as possible to zero and that all the voltage $V_P$ and $V_Q$ (negative and equal, or in higher modulus, to $V_{RESET}$) drops at the ends of the respective memristor P and Q, that therefore switches to high resistance state (HRS).

During reading, the transistor 15 is switched off ($V_{G1}$=0), such to leave its drain voltage as floating. On the contrary $V_{G2}$ is kept high, to be sure that substantially all voltages $V_P$ and $V_Q$ applied to positive electrodes of P and Q are between such electrodes and the positive input of the comparator 12. As said above with reference to FIG. 3, in this step the voltages $V_P$ and $V_Q$ are of equal modulus and opposite sign: $V_P$=Vread and $V_Q$=−Vread. The voltage $V_{OUT}$ therefore will take a positive or negative sign depending on the value of the resistances of P and Q; the corresponding voltage $V_{OUT2}$ therefore will be equal to the power voltage VDD or to ground voltage, thus determining a bit with a logic value 1 or 0.

Figure 6:
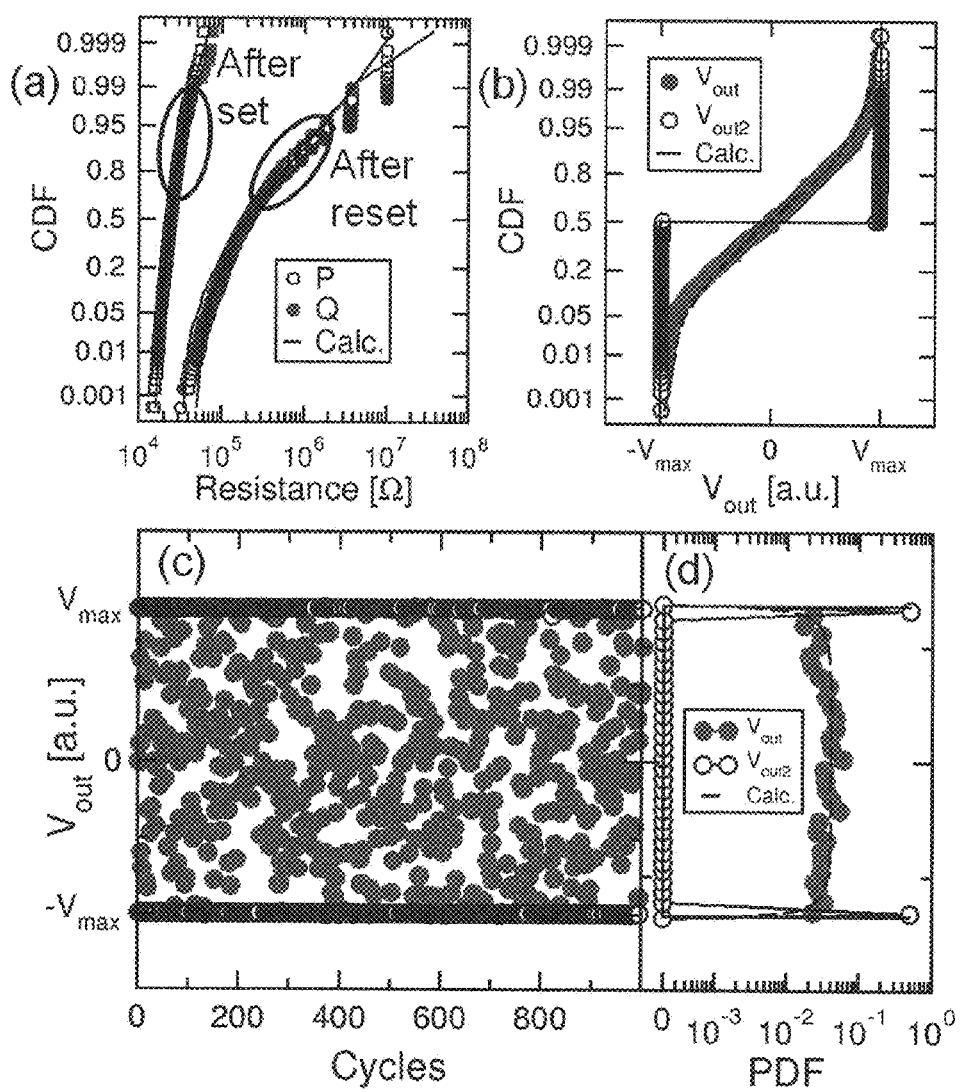
FIG. 6 is the experimental results obtained by a RNG cycle implemented by the device of FIG. 4.

In order to demonstrate the efficiency of the device and of the RNG method described above, FIG. 6 shows the results of some tests performed with the circuit of FIG. 4(a).

FIG. 6(a) shows the cumulative distribution of resistance $R_P$ of P and of resistance $R_Q$ of Q, measured after SET and RESET transitions.

RNG method was tested during 1000 cycles, this provides a sufficient statistical accuracy with a negligible degradation of the device.

Distributions $R_P$ and $R_Q$ are almost identical both in LRS and HRS, which is the key to reach an unbiased RNG of true random numbers.

FIG. 6(b) shows experimental and calculated distributions of $V_{out}$ obtained during reading. The measured distribution of $V_{out}$ follows a bimodal form with probability transition of 50%.

As it can be observed still in FIG. 6(b), the bimodal distribution was improved by introducing in the circuit of FIG. 4(a) an analog comparator (12), that allows a $V_{out2}$ to be equally distributed on values $+V_{max}$ (corresponding to a logic 1) and $-V_{max}$ (corresponding to a logic 0).

The comparator 12 can be replaced by one or more integrated CMOS inverters in an integrated circuit to reduce the area occupied on the chip.

FIG. 6(c) shows voltages $V_{out}$ and $V_{out2}$ measured during 1000 cycles of the RNG method, while FIG. 6(d) shows the corresponding probability density function (PDF) of $V_{out}$ and $V_{out2}$.

Figure 7:
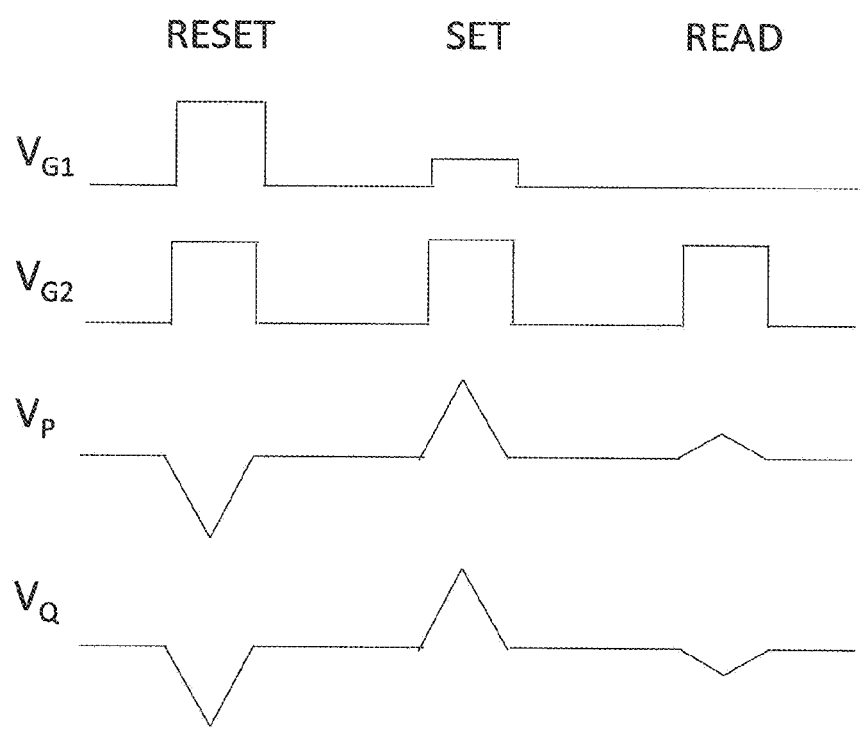
FIG. 7 is a sequence of voltage pulses that, once applied to the device of FIG. 4, allow a different RNG method to be implemented.

FIG. 7 shows a sequence of voltage pulses alternative to the sequence of FIG. 4, that allows, by the same circuit of FIG. 4(a), a RNG method alternative to that of FIG. 3 to be implemented.

According to this method, a triangular voltage pulse of 1 ms in duration and with a value higher than (in absolute value) $V_{Reset}$ is initially applied to top electrodes (TE) of P and Q. During such step the transistors 15 and 20 are kept switched on with a gate voltage high enough to short circuit drain and source (e.g. $V_{G1}=V_{G2}=V_{DD}\gg V_{DS}$), such to bring $V_{out}$ substantially to ground and to cause all the voltage $V_P$ and $V_Q$ to fall on memristors P and Q which therefore switch to HRS.

Then a voltage higher than $V_{SET}$ (for example VDD) is applied to memristors P and Q which causes a random transition of P or Q to the LRS. In this step the transistor 15 is kept switched on, but with a gate voltage $V_{G1}$ slightly higher than threshold, such to operate as a resistance to ground for P and Q. Transistors 20 on the contrary are kept switched on with $V_{G2}$ equal to VDD, such to be short circuited. During this step, one of the two transistors switches to LRS; when this happens the potential of its bottom electrode BE and therefore also of $V_{OUT}$, follows and gets near VDD, reducing voltage at the ends of both the memristors and thus preventing the other memristor from performing SET transition and from switching to LRS. Thus only one of the two memristors carries out the transition to LRS, the one of the two memristors that due to statistical fluctuations has the smallest transition voltage Vset.

Finally the RNG cycle provides to switch off the transistor 15 ($V_{G1}=0$) and to read output voltage $V_{OUT}$ (or $V_{OUT2}$) as shown above for the device of FIG. 1(a), that is by applying a differential voltage (equal to $2V_{READ}$ in this embodiment) between the electrodes TE of P and Q. The voltage $V_{out}$ will have a positive or negative value depending on which of the two memristors has carried out the SET transition.

Since SET transition in P and Q is random, there is no need for any probability tracking circuit, since SET transition is naturally present in a single memristor at each cycle.

Figure 8:
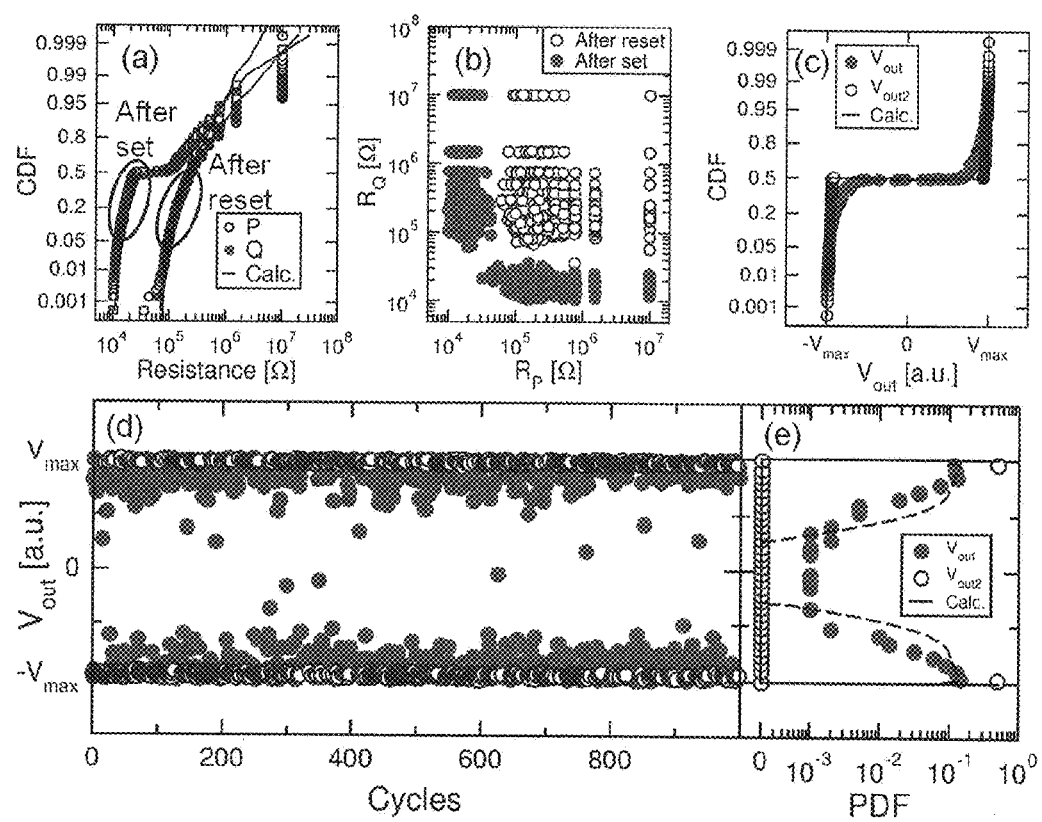
FIG. 8 is the experimental results obtained by a RNG cycle implemented by the device of FIG. 4 and the method of FIG. 7.

FIG. 8(a) shows the bimodal distribution of resistance R resulting for P and Q, which exhibits a bimodal distribution with a HRS/LRS transition at 50%. Calculations were carried out by randomly moving 50% of the samples from the HRS distribution to LRS distribution. FIG. 8(b) shows the correlation plot of $R_Q$ as a function of $R_P$, indicating complementary states, that is P is always in HRS if Q is in LRS and vice versa. FIG. 8(c) shows the cumulative distribution of $V_{out}$ and $V_{out2}$, the latter being the regenerated output of the CMP. Nice bimodal distributions are noted with smooth and abrupt transitions for $V_{out}$ and $V_{out2}$ respectively. FIGS. 8(d) and 8(e) show $V_{out}$ and $V_{out2}$ as a function of the RNG cycle (d) and the corresponding probability density function PDF (e). Calculations were performed for FIGS. 8(c) and (e), showing a good agreement with data.

In the light of the above mentioned examples it is clear how the invention allows the above objects to be achieved.

It is also clear that the person skilled in the art can make changes to the above examples without for this reason departing from the scope of protection as it results from the annexed claims.

For example, voltage pulses applied to top electrodes (TE) of P and Q can have any shape and duration, for example can have a rectangular or parabolic shape.

Still, the division of the device in the two blocks composed of the generating section 10 and the control logic 11, has to be intended by way of example and not as a limitation. For example the transistor 15 of FIGS. 4 and 7 can be a part of the circuit of the control logic 11.

It has to be noted that teaching of the invention can be applied also to all methods intended to increase entropy of the sequence of random numbers produced by the device 1 of FIGS. 1 and 4. An entropy increase method is any post-processing of raw data, for example a selection of bits according to the Von Neumann algorithm, or any other algorithm intended to modify the sequence or to mix it with another entropy source.

Moreover teaching of the invention can be also applied to all methods intended to pre-condition random number generation devices such to obtain a better functionality (for example a higher cycling life) or for a better generation of random numbers.

It has also to be noted that the memristors that can be used in the device 1 can be of different types; for example all memristors able to change their resistance as a response to the application of pulses are suitable. In the type of usable memristors for example we have:

Phase change memory devices (Phase Change Memory, PCM);
Unipolar resistive switching devices (unipolar RRAM);
Magnetic tunnel junction devices (Magneto-Tunnel Junction, MTJ), such as for example spin-transfer torque memories (STT-RAM) and spin-orbit torque memories (SOT-RAM);
Ferromagnetic tunnel junction memories (Ferroelectric Tunnel Junction, FTJ).

According to another embodiment, memristors P and Q of the device 1 can be of different types, such as the case when, for example, one of the two memristors is a bipolar RRAM and the other memristor is a unipolar RRAM.

With reference to the memristors of the device, 1, memristor devices wherein resistance is modified for a limited time can be also used, such as for example threshold switching devices where LRS spontaneously switches to HRS after SET transition. Such devices for example can contain materials such as:

insulator-metal transition metal oxides, such as vanadium oxide and niobium oxide;
amorphous chalcogenides, such as for example some alloys of the group TeAsGeSi;
insulators such as silicon oxide, or silicon nitride, combined or doped with metals, such as Ag, that exhibit spontaneous transitions from LRS to HRS after set operation.

That which is claimed is:

1. A device for generating random numbers, comprising:
   a pair of memristors comprising a first and a second memristor, each memristor of the pair comprising a top electrode, a bottom electrode and an intermediate layer adapted to switch resistance in response to predetermined voltage values applied between the top electrode and the bottom electrode;
   an output terminal operatively connected to said pair of memristors; and
   a control logic adapted to apply a transition voltage at the ends of each memristor in order to cause a change of resistance in the memristor;
   wherein each memristor is operatively connected to the output terminal by means of its bottom electrode; and
   and wherein the control logic is configured to:
      fix the voltage of the output terminal to a predetermined value and apply said transition voltage to cause a change of resistance in at least one memristor of the pair, leave the voltage at said output terminal floating and apply to the top electrodes of said first and second memristor two read voltages having opposite sign and amplitude lower than said transition voltage.

2. A device according to claim 1, wherein the transition voltage is a SET voltage such to cause a transition from high resistance to low resistance in said at least one memristor of the pair, and wherein the control logic is further configured to apply a RESET voltage to said pair of memristors such to cause a transition from low to high resistance in both the memristors of the pair, the control logic being adapted to apply said SET voltage after said RESET voltage.

3. A device according to claim 1, wherein the transition voltage is a RESET voltage such to cause a transition from low resistance to high resistance in both the memristors of the pair, and wherein the control logic is further configured to apply a SET voltage to said pair of memristors such to cause a transition from high to low resistance in at least one memristor of the pair, said SET voltage being applied before said RESET voltage.

4. A device according to claim 1, further comprising a comparator circuit comprising a first and a second input terminal, wherein the first input terminal is connected to the output terminal and wherein the second input terminal is grounded.

5. A device according to claim 1, wherein the first and the second memristor are comprised in a respective cell of a RRAM, said respective cell comprising a memristor whose bottom electrode is connected to the drain of a cell transistor, said cell transistor comprising a source electrode connected to the output terminal.

6. A device according to claim 1, further comprising a pilot transistor whose source electrode is grounded and whose drain electrode is connected to the output terminal, the control logic being operatively connected to the gate of the pilot transistor to command its switch on and/or switch off.

7. A method for generating random numbers, wherein a random number is generated by using a statistical variation of an electric resistance of at least one memristor of a pair of memristors, said pair of memristors comprising a first and a second memristor, each memristor of the pair comprising a top electrode, a bottom electrode and an intermediate layer adapted to switch resistance in response to predetermined voltage values applied between the top electrode and the bottom electrode, the method comprising:
   causing a change of resistance in at least one memristor of the pair by applying to said at least one memristor a transition voltage;
   reading a voltage value at an output terminal operatively connected to said pair of memristors; and
   associating a number to the voltage value of the output terminal;
   wherein each memristor of the pair is operatively connected to the output terminal by means of its bottom electrode; and
   further comprising:
      fixing the voltage of the output terminal to a predetermined value and applying said transition voltage to cause a change of resistance in at least one memristor of the pair; and
      leaving the voltage at said output terminal floating and apply to the top electrodes of said first and second memristor two read voltages having opposite sign and amplitude lower than said transition voltage.

8. A method according to claim 7, wherein the transition voltage is a SET voltage such to cause a transition from high resistance to low resistance in said at least one memristor of the pair, and wherein the method further comprises the step of applying a RESET voltage to said pair of memristors such to cause a transition from low to high resistance in both the memristors of the pair, said SET voltage being applied after said RESET voltage.

9. A method according to claim 7, wherein the transition voltage is a RESET voltage such to cause a transition from low resistance to high resistance in both the memristors of the pair, and wherein the method further comprises the step of applying a SET voltage to said pair of memristors such to cause a transition from high to low resistance in at least one memristor of the pair, said SET voltage being applied before said RESET voltage.

* * * * *